United States Patent Office 3,385,060
Patented May 28, 1968

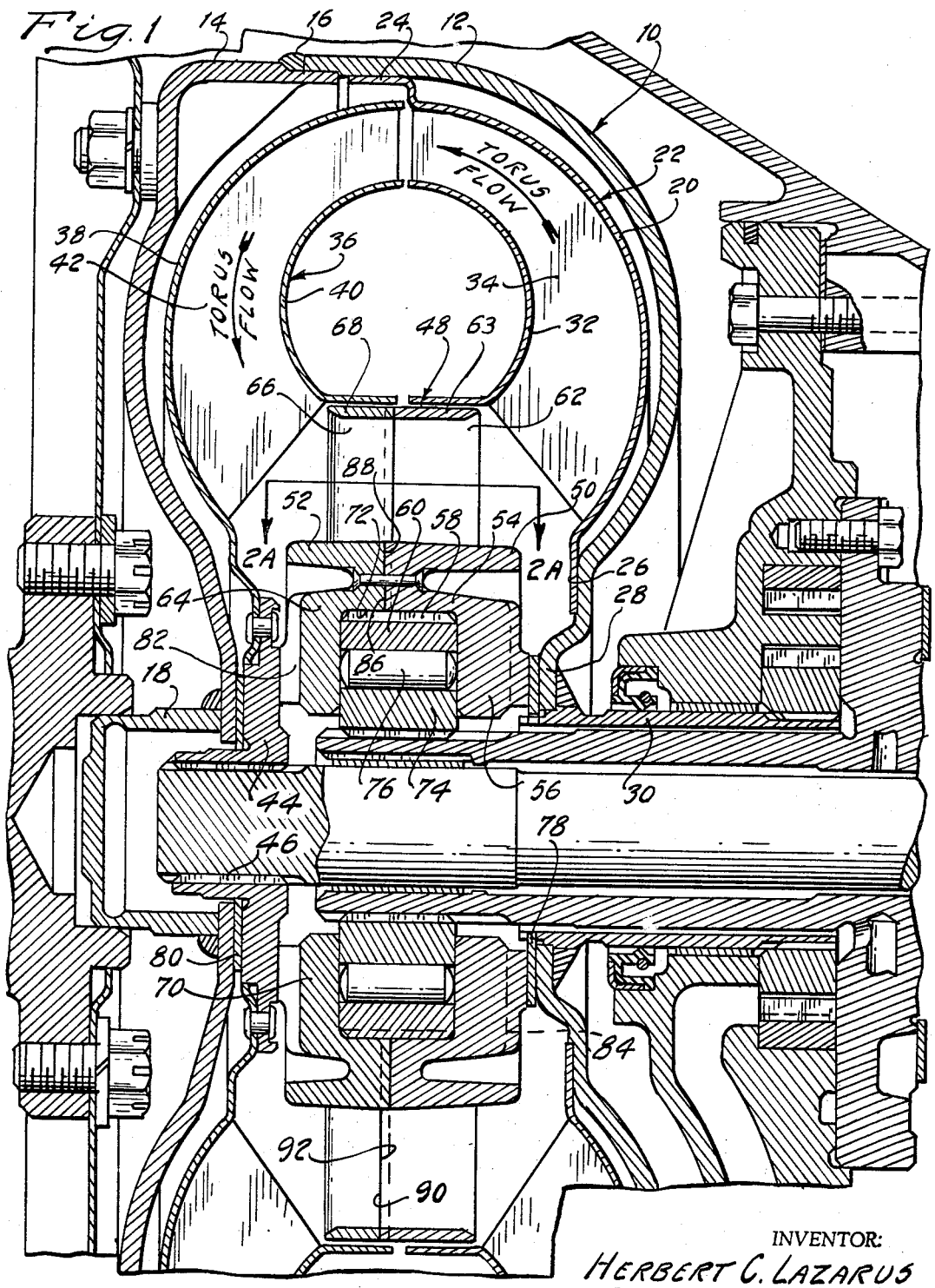

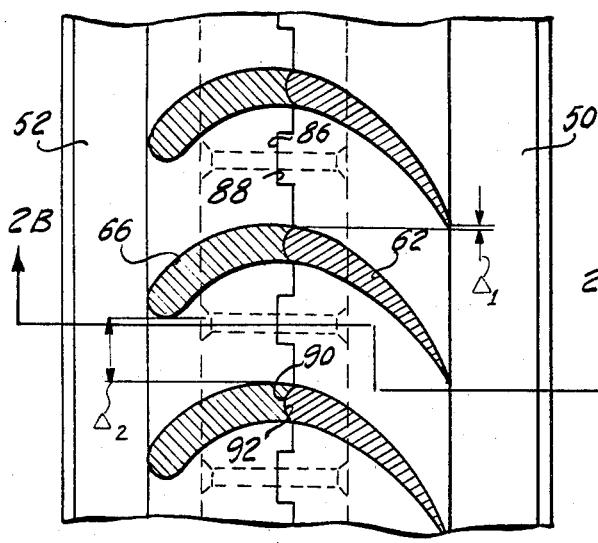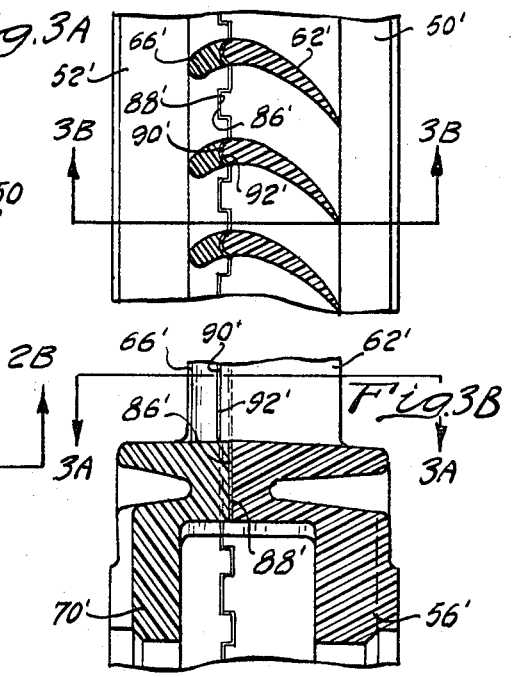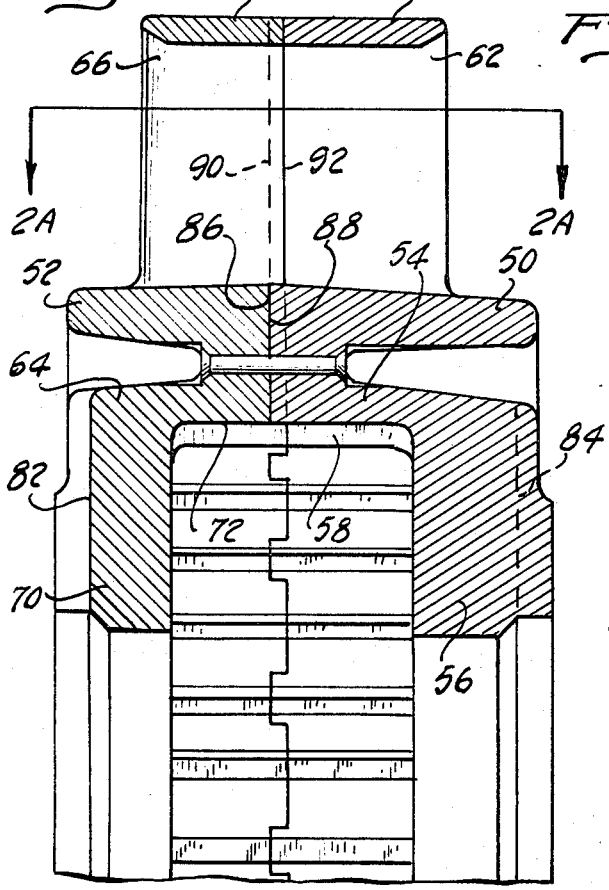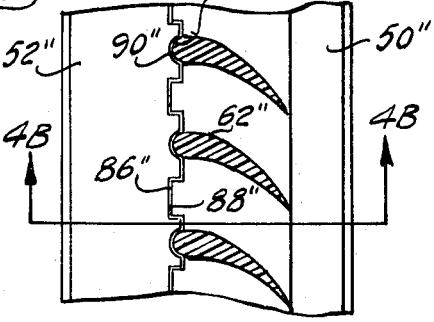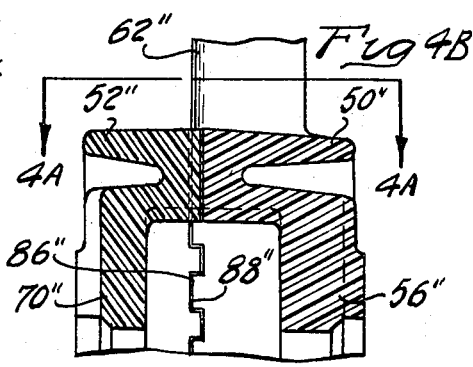

3,385,060
HYDROKINETIC TORQUE CONVERTER MECHANISM WITH MULTIPLE SECTION REACTOR BLADES
Herbert C. Lazarus, Plymouth, Mich., assignor to Ford Motor Company, Dearborn, Mich., a corporation of Delaware
Filed May 2, 1966, Ser. No. 546,889
7 Claims. (Cl. 60—54)

ABSTRACT OF THE DISCLOSURE

This specification describes a hydrokinetic torque converter unit having a bladed stator situated between the flow exit section of the bladed turbine and the flow entrance section of the bladed impeller. The stator, including its radially positioned blades, has two sections. The blade sections are joined together in abutting relationship to define continuous blade sections having extreme flow directing blade angles. The individual blade sections are die-cast as separate units by using axial-draw dies.

My invention relates generally to hydrokinetic torque converter mechanisms, and more particularly to improvements in a bladed reactor for a hydrokinetic torque converter assembly.

A typical hydrokinetic torque converter mechanism used in automotive vehicle drivelines included a bladed impeller having radial outflow passages defined by the impeller blading, a bladed turbine having a radial inflow passages and a bladed stator situated between the flow inlet region of the impeller blading and the flow exit region of the turbine blading. The hydrokinetic fluid circulates through the torus circuit, and the change in the moment of momentum of the fluid, as it traverses the bladed passages in the turbine, determines the magnitude of the torque developed by the turbine. Toroidal fluid circulation is developed by the bladed impeller which in turn is driven by the vehicle engine.

The bladed reactor changes the tangential component of the absolute fluid flow velocity vectors of the fluid that passes from the exit region of the turbine to the entrance region of the impeller. The resulting torque reaction acting upon the blades of the reactor is transmitted to a stationary housing through an overrunning brake. The change in the direction of the flow velocity vectors makes possible an augmentation of the torque developed by the turbine relative to the torque applied to the impeller. In performing this function, however, the reactor is compelled to receive fluid with a wide variation in reactor flow entrance angles. The angularity of the absolute fluid flow velocity vectors for the fluid that enters the blades of the reactor vary as the speed ratio of the converter mechanism changes, the speed ratio being defined as the turbine speed divided by the impeller speed for any given driving condition.

In designing the blade geometry for converters of this type, it is usual practice to provide the reactor blading with a large camber profile at the leading edges and a rather blunt, rounded nose on the individual reactor blades. Such a profile and the angularity of the reactor blades can be chosen to provide a minimum "flow entry" loss at the entrance region of the reactor at any predetermined speed ratio. As the speed ratio deviates from the predetermined value, the fluid flow velocity vectors of the fluid at the entrance region of the reactor approach the leading edge of the reactor blades at an angle that is substantially different than the angle of entry of the blade itself. Thus a considerable degree of shock loss may occur.

If it is desired to provide a converter assembly having the highest possible torque ratio at stall, the angularity of the vectors at the entrance region of the reactor blades can be chosen so that they will approach the leading edges of the reactor blades at an angle that is substantially the same as the reactor blade entrance angle at low speed ratios. This is accomplished, however, at the expense of the efficiency of the converter during operation in higher speed ratios. Conversely, if it is desired to provide a converter assembly having optimum efficiency at advanced speed ratios rather than maximum torque ratio at low speed ratios, the entrance angle of the reactor blades can be chosen so that the vectors representing the flow of fluid at the entrance region approach the leading edges of the reactor blades at advanced speed ratios with substantial alignment with the entrance blade angle.

It is an object of my invention to provide a reactor assembly having two separate sections, the entrance region of the reactor blades being located in one section and the trailing edge portions of the reactor blade being located in the other section. In this way it is possible to combine the trialing edge portion of the reactor assembly with any one of several leading edge portions. Conversely, any one leading edge portion can be combined with any one of several trailing edge portions. Any one of a variety of reactor blade geometries then can be provided depending upon the particular operating characteristics of the converter that are desired.

In a three element torque converter of the type herein disclosed it is necessary to provide reactor blades with a substantial curvature in order to obtain the most efficient energy conversion. It is common practice to extend the trailing edges of the blades in a generally tangential direction. The passages defined by the reactor blades thus extend generally transversely, as well as axially, with respect to the converter axis.

Reactor blades of this type usually are formed by means of destructible core casting procedures as by means of multiple section, radial-draw dies in a die-casting operation. Because of the compound curvature of the passage defined by the blades, it is impossible to withdraw conventional die sections axially. It is for this reason that die casting procedures for converter reactors require molds that will permit radial withdrawal of the sections. By employing the improvements of my invention, however, it is possible to employ a two-part, die mold assembly in which the mold sections are adapted to be withdrawn axially relative to the converter axis rather than radially. The provision of an assembly of this type is an object of my invention.

In a reactor for a torque converter of the type above set forth, the leading edges of the reactor blading being located in one reactor portion and the trailing edges of the reactor blading being located in the other reactor portion.

It is another object of my invention to provide a reactor assembly of the type above set forth wherein each reactor portion is provided with a hub that serves as a thrust element as well as an enclosure for an overrunning brake associated with the reactor assembly.

It is a further object of my invention to provide a hydrokinetic torque converter having an improved reactor assembly of the type above set forth and which is characterized by a reduction in the number of assembled parts when compared to a torque converter of comparable size with comparable performance characteristics.

Further objects and features of my invention will become apparent from the following description and from the accompanying drawings, wherein:

FIGURE 1 shows in longitudinal cross sectional form a hydrokinetic torque converter having three elements and which embodies the improvements of my invention;

FIGURE 2A is a cross sectional view taken along the plane of section line 2A—2A of FIGURES 1 and 2B;

FIGURE 2B is a cross sectional view taken along the plane of section line 2B—2B of FIGURE 2A;

FIGURES 3A and 3B are views corresponding to FIGURES 2A and 2B, respectively, but which show an alternate form of reactor blading;

Figure 5A:
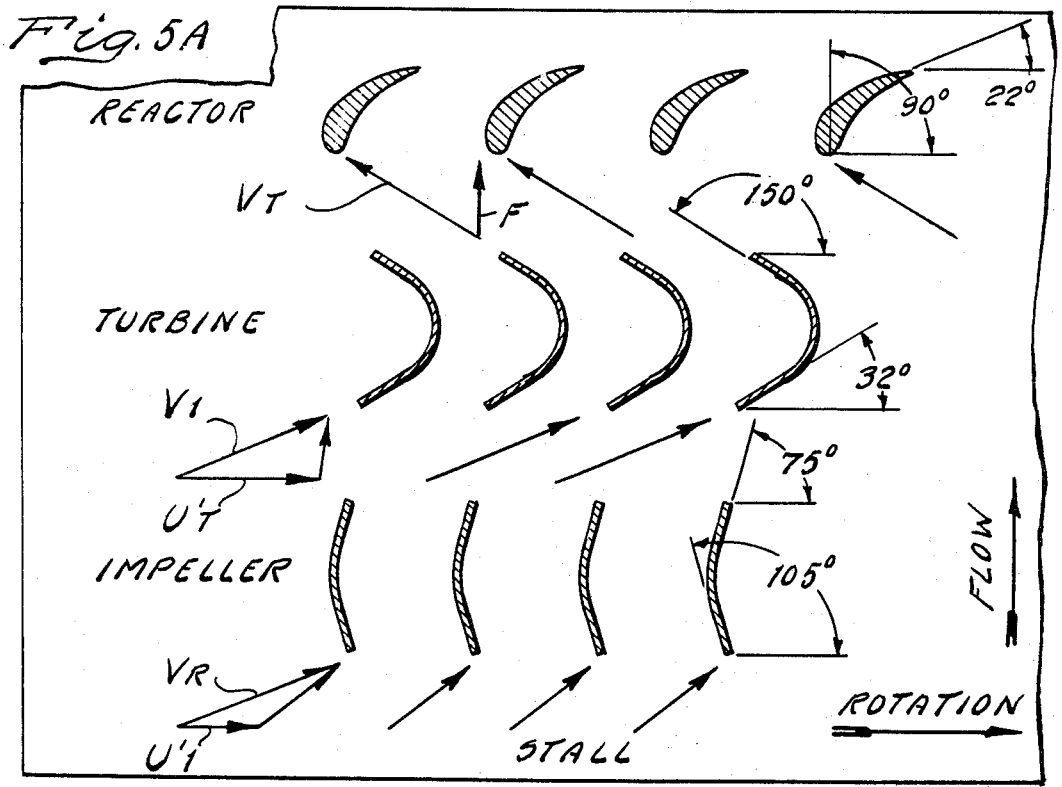
Figure 5B:
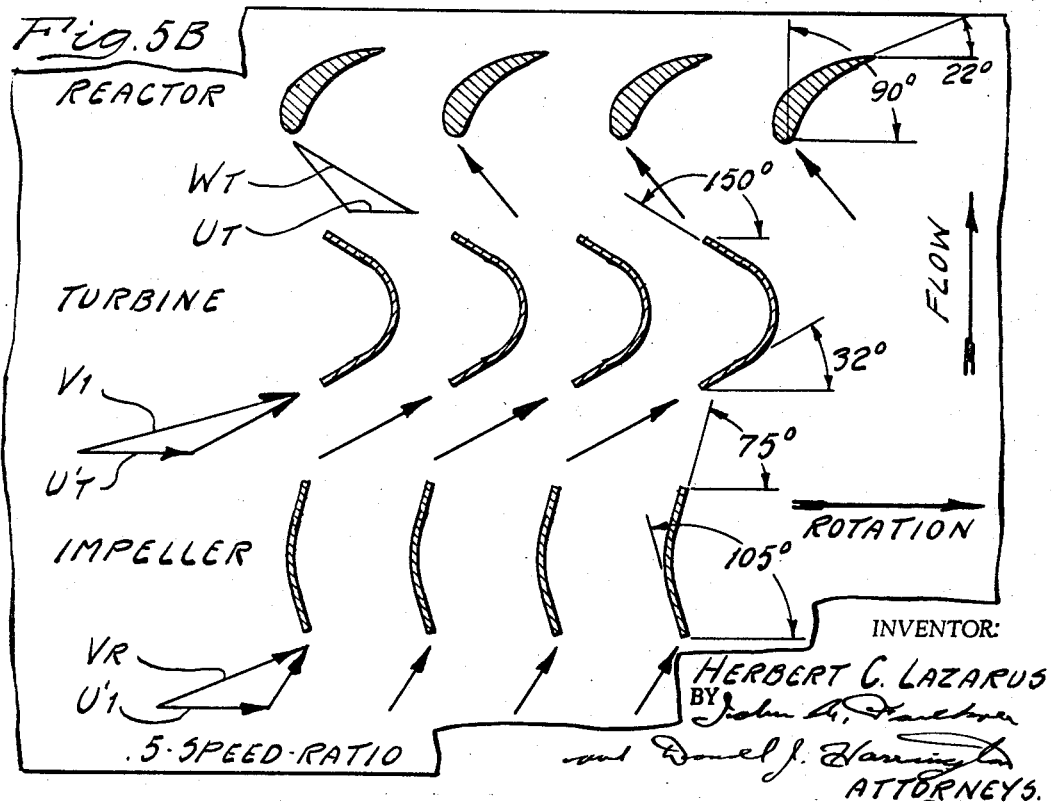
Figure 5C:
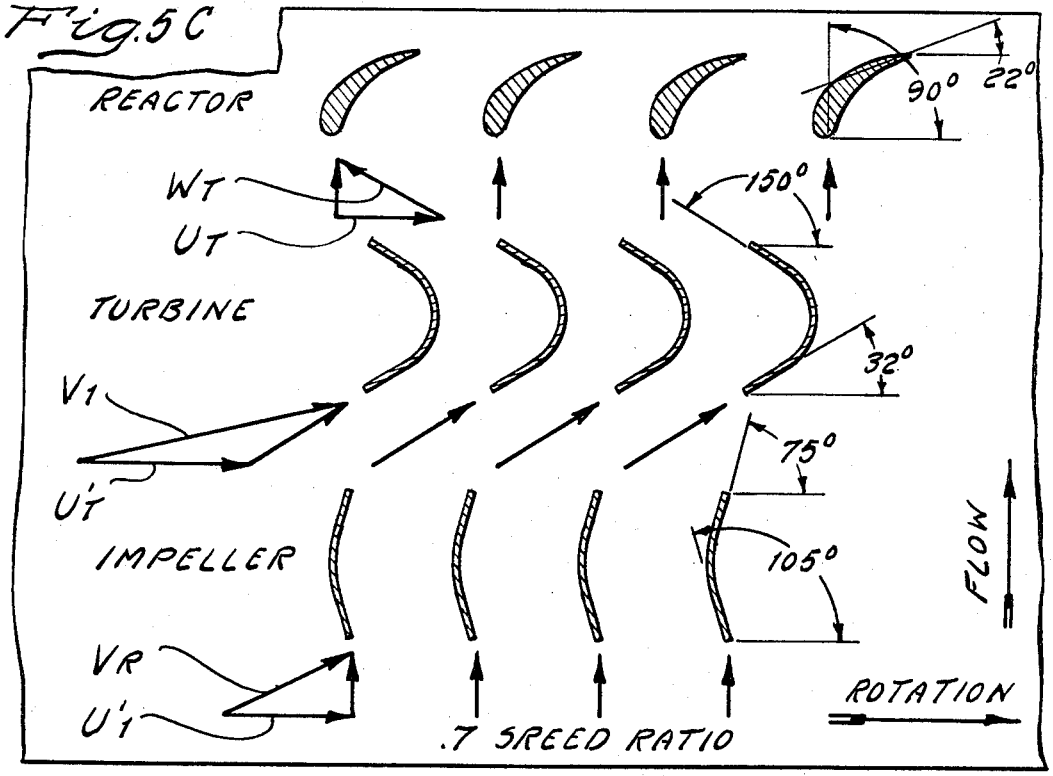
Figure 5D:
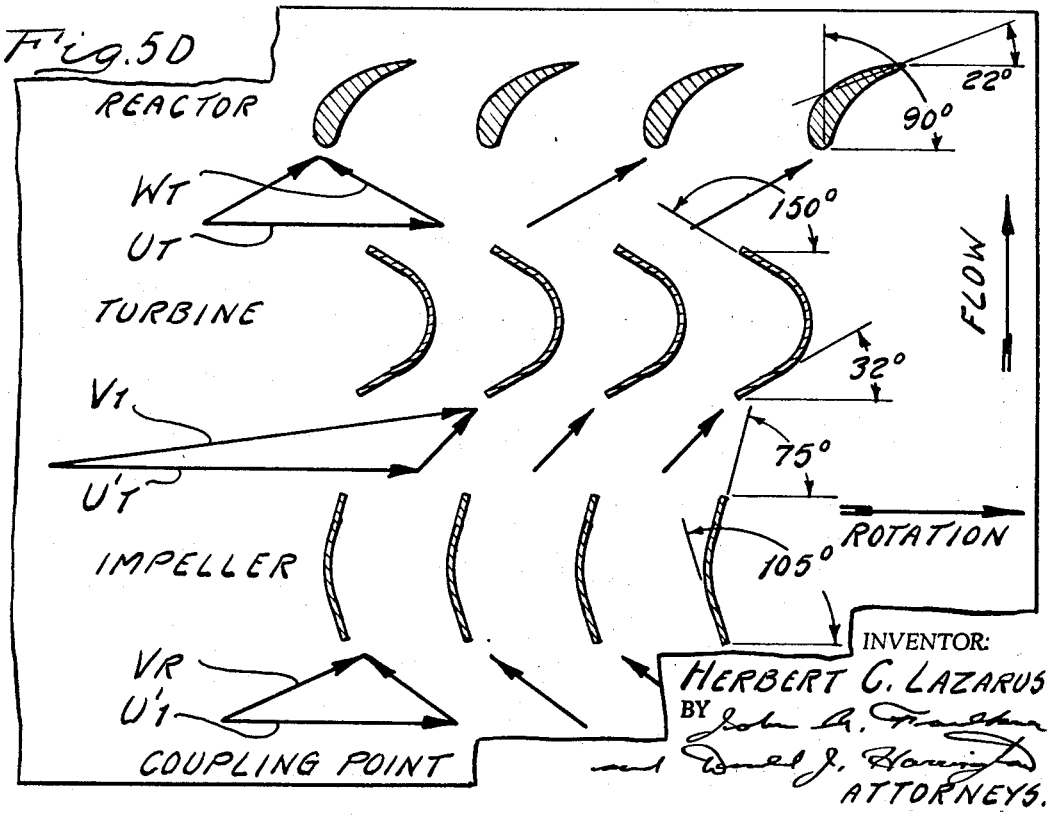

FIGURES 4A and 4B are views similar to FIGURES 3A and 3B, respectively, although they show only one reactor blading portion; and FIGURES 5A, 5B, 5C and 5D are vector diagrams showing the magnitudes and directions of the flow vectors at the entrance regions of each blade assembly of the converter. Included in these figures are illustrations of the vectors that exist under stall conditions, during operation at a speed ratio .5, during operation at a speed ratio .7 and during operation at the coupling point.

In FIGURE 1, numeral 10 designates an impeller shell which defines a toroidal fluid flow cavity. It includes two principal shell parts 12 and 14 which are secured in overlapping relation on their outer peripheries and held together by welding 16.

The radially inward region of shell part 14 is secured to a hub 18 which is piloted within a pilot opening formed in the end of a crankshaft for an internal combustion engine. The crankshaft can be connected drivably to shell part 14 by means of a suitable drive plate.

Shell part 12 receives the outer shroud 20 of an impeller 22. Shroud 20 is secured at its outer margin 24 to the outer extremity of the shell part 12 and is secured also at its inner margin 26 to the hub portion 28 of the shell part 12. The impeller shell is supported by sleeve shaft 30 which is welded or otherwise secured to the hub portion 28. The sleeve shaft in turn can be journaled within a suitable opening formed in a relatively stationary wall that forms in turn a part of the transmission housing.

Impeller 22 includes also an inner shroud 32. Disposed between the shrouds 20 and 32 is a series of impeller blades 34 extending generally in a radially outward direction to define radial outflow passages.

A turbine 36 is situated in juxtaposed fluid flow relationship with respect to the impeller 22. It comprises an outer shroud 38, an inner shroud 40 and blades 42 situated between the shrouds 38 and 40. The blades and the shrouds define radial inflow passages.

The shroud 38 is connected at its inner region to a turbine hub member 44 which may be splined at 46 to a turbine shaft that extends axially and that is connected to a power input gear element of a multiple speed ratio gear system not shown.

Situated between a flow exit region of the turbine 36 and the flow entrance region of the impeller 22 is a bladed reactor 48. The reactor 48 includes two cast reactor parts identified separately by reference characters 50 and 52. Part 50 includes a hub 54 having a thrust ring 56 formed integrally therewith. Hub 54 includes also internal splines 58 which receive external splines formed on overrunning brake outer race 60. Thrust ring 56 and hub 54 are formed integrally as part of a common casting. Extending radially outwardly from hub 54 are blade sections 62 about which is formed a reactor blade ring or shroud 63.

Situated in adjacent, juxtaposed relationship with respect to the hub 54 is a hub 64 of another reactor section. Extending radially outwardly from hub 64 is a series of blades 66 about which is positioned a blade ring or shroud 68. Formed integrally therewith is a thrust ring 70. Hub 64 is internally splined to receive externally splined, overrunning brake race 60. Suitable splines are shown at 72. But in lieu of splines 58 and 72, a key and slot connection may be provided if desired.

The overrunning brake of which race 60 forms a part includes also an inner race 74 and overrunning brake rollers 76. Race 60 may be cammed to permit camming action with rollers 76. Race 74 may be splined to a sleeve shaft that extends through sleeve shaft 30. The stator sleeve shaft in turn is secured in a fixed fashion to the relatively stationary transmission housing.

Overrunning brake rollers 76 permit freewheeling motion of the stator sections 50 and 52 in the direction of rotation of the impeller, but it inhibits rotation of the stator sections in the opposite direction.

Thrust ring 56 is situated between the overrunning brake and the hub 28. A thrust washer 78 is provided as shown to provide a bearing action. The hub 44 situated between thrust ring 70 and the radially inward region of shell part 14, a thrust washer 80 being provided at this location as indicated. The left-hand end surface of thrust ring 70 is provided with radial flow passages 82. Similarly, the right-hand end surface of thrust ring 56 is provided with flow passages 84. Passages 84 form in part a fluid feed passage system for the torus and passages 82 form a flow return passage system.

The stator section 50 is arranged in adjacent, abutting relationship with respect to the stator section 52. One section is held fast with respect to the other by interlocking projections and recesses 86 and 88, respectively. As best indicated in FIGURE 2, when the stator sections are assembled as shown, blade portions 62 become aligned with blade portions 66. The forward edge of blade portions 62 are rounded as shown at 90. These rounded ends register with rounded recesses 92 formed in the rearward edges of the blade portions 66. Thus when the stator sections are assembled as shown, the blade portions register with each other to define relatively long blades of substantial curvature.

It can be seen in FIGURE 2A that the trailing edge point for one of the blades 62 is displaced circumferentially with respect to the leading edge surface of the adjacent blade section 62. This displacement is indicated by the symbol $\Delta_1$. It is apparent, therefore, that the stator section 50 can be cast by means of a die casting operation with the die sections being removable in an axial direction. Similarly, the leading edge surface of each blade section 66 is displaced angularly with respect to the trailing edge surfaces of the adjacent blade section 66. This angular displacement is indicated in FIGURE 2A by the symbol $\Delta_2$. Thus the stator section 52 also can be formed by means of a die casting operation wherein the dies can be withdrawn axially.

The complete blade configuraion can be altered by applying a different reactor flow entrance section and matching it with the flow exit reactor section. For example, as shown in FIGURE 3A, the flow entrance of blade sections can be shortened and provided with a substantially different flow entrance angle than that which exists with the arrangement of FIGURE 2A.

In FIGURES 4A and 4B, there is shown a reactor assembly in which the flow entrance blade sections are eliminated entirely. By appropriately matching reactor sections of various configurations, the converter size factor can be altered as desired. The size factor is an indicator of torque converter capacity and is equal to impeller speed divided by the square root of the impeller torque. A different size factor exists for each speed ratio. The torque ratio can be controlled by appropriately choosing and matching the reactor sections in the same fashion. Thus the same basic converter elements can be used for adapting any given converter design to meet a variety of operating requirements.

The direction and the approximate magnitudes of the flow vectors at various speed ratios are shown in FIGURES 5A, 5B, 5C and 5D. These vectors represent the motion of a particle of fluid as it traverses the torus circuit. In the diagrams, the vector $U'_1$ represents the motion of the tip of the impeller blades. The blades shown in the diagrams of FIGURES 5A through 5D are illustrated in an unwrapped condition. When viewed in this fashion the blades define blade cascades.

The vector $U'_1$ represents a motion of a point at the entrance region of the impeller blades. The absolute flow velocity vector for a particle of fluid leaving the reactor blade is represented by the symbol $V_r$. The absolute velocity for that particle of fluid is the vector sum of the vectors $V_r$ and $U'_i$.

The vector representing the motion of a point on the entrance region of the turbine blading is shown in the diagrams at $U'_t$. The absolute flow velocity for a particle of fluid at the region between the exit section of the impeller and the entrance section of the turbine is shown at $V_i$. The absolute flow velocity for a particle of fluid at the entrance section of the turbine blading is a vector sum of the two vectors $V_i$ and $U'_t$.

The vector representing the motion of a particle of fluid at the region of the torus circuit between the turbine flow exit section and the reactor flow entrance section is shown by the symbol $V_t$. That reactor also is the absolute flow velocity vector, which is the vector sum of the vectors $U_t$ and $W_t$. It is apparent from an inspection of the diagrams of FIGURE 5 that the angularity of this latter vector with respect to the angularity of the reactor blading, varies considerably as the speed ratio changes. It is because of this characteristic that the performance of the converter can be controlled by appropriately choosing and matching the reactor blade sections by providing a reactor blade combination that will produce both a favorable flow entrance condition at lower speed ratios and a maximum change in momentum of the fluid that traverses the blanded passages of the reactor. The converter performance at stall can be improved in this way although the efficiency at higher speed ratios will suffer. The efficiency can be improved at higher speed ratios at a sacrifice of performance at the lower speed ratios, however, by appropriately choosing reactor blade sections that are favorable for the vectors as they exist during operation at higher speed ratios.

If the reactor sections are formed of cast aluminum, the two sections can be riveted together, if desired, and by securing them together with interlocking projections and recesses as shown in FIGURE 2. I contemplate also that phenolic plastics can be used in forming the blade sections. Examples are shown in FIGURES 3A, 3B, 4A and 4B where the elements are identified by reference characters that are similar to the reference characters used in FIGURES 1, 2A and 2B although prime and double prime notations are used. If such plastics are used, an epoxy cement would be used for securing the two molded plastic sections together. Regardless of whether aluminum or plastic is used as the reactor material, the geometry of the reactor sections accommodates readily die casting operations using axially movable dies.

In FIGURES 3A and 3B, I have shown a plastic reactor with a shortened leading edge blade portion. In the corresponding views of FIGURES 4A and 4B, I have shown a plastic reactor with only a single blade portion as the trailing edge portion.

Having thus described a preferred form of my invention, what I claim and desire to secure by U.S. Letters Patent is:

1. A hydrokinetic torque converter mechanism comprising a bladed impeller, a bladed turbine and a bladed stator situated in toroidal fluid flow relationship, said stator being situated at a radially inward region of said circuit, a driving member connnected to said impeller, a driven member connected to said turbine, said reactor comprising a pair of abutting reactor sections, each section comprising a hub, means for securing said hubs together to define a unitary structure, overrunning brake means received in said hub for inhibiting rotation of said reactor in one direction while accommodating freewheeling motion in the opposite direction, said overrunning brake means comprising an outer race secured to said hubs, an inner race connected to a stationary portion of said mechanism, and overrunning brake elements situated between said races, one hub having formed integrally therewith a thrust ring situated between the radially inward portion of said impeller and said overrunning brake races, the other hub having formed integrally therewith a thrust ring situated between said overrunning brake races and the radially inward portion of said turbine.

2. A hydrokinetic torque converter mechanism comprising a bladed impeller, a bladed turbine and a bladed stator situated in toroidal fluid flow relationship, said stator being situated at a radially inward region of said circuit, a driving member connected to said impeller, a driven member connected to said turbine, said reactor comprising a pair of abutting reactor sections, each section comprising a hub, the hubs of said sections have abutting surfaces, means for securing said hubs together to define a unitary structure, overrunning brake means received in said hub for inhibiting rotation of said reactor in one direction while accommodating freewheeling motion in the opposite direction, said overrunning brake means comprising an outer race secured to said hubs, an inner race connected to a stationary portion of said mechanism, overrunning brake elements situated between said races, one hub having formed integrally therewith a thrust ring situated between the radially inward portion of said impeller and said overrunning brake races, the other hub having formed integrally therewith a thrust ring situated between said overrunning brake races and the radially inward portion of said turbine, and blade elements formed integrally with at least one of said reactor hubs and extending into said torus circuit at a location intermediate the flow entrance region of said turbine and the flow entrance region of said impeller.

3. A hydrokinetic torque converter mechanism comprising a bladed impeller, a bladed turbine and a bladed stator situated in toroidal fluid flow relationship, said stator being situated at a radially inward region of said circuit, a driving member connected to said impeller, a driven member connected to said turbine, said reactor comprising a pair of abutting reactor sections, each section comprising a hub, the hubs of said sections having abutting surfaces, means for securing said hubs together to define a unitary structure, overrunning brake means received in said hub for inhibiting rotation of said reactor in one direction while accommodating freewheeling motion in the opposite direction, and blade elements situated radially outwardly of said hubs in said torus circuit intermediate the flow entrance region of said impeller and the flow exit region of said turbine, said blade elements including first trailing edge blade portions formed integrally with one of said hubs, said blade elements including also leading edge blade portions formed integrally with the other of said hubs, the trailing edge of said other blade elements and the leading edge of said first blade elements being situated in registry thereby defining a substantially continuous flow directing blade assembly.

4. A hydrokinetic torque converter mechanism comprising a bladed impeller, a bladed turbine and a bladed stator situated in toroidal fluid flow relationship, said stator being situated at a radially inward region of said circuit, a driving member connected to said impeller, a driven member connected to said turbine, said reactor comprising a pair of abutting reactor sections, each section comprising a hub, the hubs of said sections having abutting surfaces, means for securing said hubs together to define a unitary structure, overrunning brake means received in said hub for inhibiting rotation of said reactor in one direction while accommodating freewheeling motion in the opposite direction, said overrunning brake means comprising an outer race secured to said hubs, an inner race connected to a stationary portion of said mechanism, overrunning brake elements situated between said races, one hub having formed integrally therewith a thrust ring situated between the radially inward portion of said impeller and said overrunning brake races, the other hub having formed integrally therewith a thrust ring situated between said overrunning brake races and the radially inward portion of said turbine, and blade elements situated radially outwardly of said hubs in said torus circuit intermediate the flow entrance region of said impeller and the flow exit region of said turbine, said blade elements including first trailing edge blade portions formed integrally with one of said hubs, said blade elements including also leading edge blade portions formed integrally with the other of said hubs, the trailing edge of said other blade elements and the leading edge of said first blade elements being situated in registry thereby defining a substantially continuous flow directing blade assembly.

5. A hydrokinetic torque converter mechanism comprising a bladed impeller, a bladed turbine and a bladed reactor assembly situated in toroidal fluid flow relationship in a common torus circuit, a driving member connected to said impeller, a driven member connected to said turbine, said reactor assembly comprising two juxtaposed and abutting reactor parts each part comprising a hub, and overrunning brake means for anchoring said hub against rotation in one direction while accommodating freewheeling motion thereof in the opposite direction, one of said hubs having formed integrally therewith radially disposed reactor blades arranged in angularly spaced relationship about the axis of said hub, one blade being displaced angularly with respect to a reference plane that contains the axis of said hub and that is tangent to the surface of the leading edge portion of an adjacent blade.

6. A hydrokinetic torque converter mechanism comprising a bladed impeller, a bladed turbine and a bladed reactor assembly situated in toroidal fluid flow relationship in a common torus circuit, a driving member connected to said impeller, a driven member connected to said turbine, said reactor assembly comprising two juxtaposed and abutting reactor parts each part comprising a hub, and overrunning brake means for anchoring said hub against rotation in one direction while accommodating freewheeling motion thereof in the opposite direction, one of said hubs having formed integrally therewith radially disposed reactor blades arranged in angularly spaced relationship about the axis of said hub, one blade being displaced angularly with respect to a reference plane that contains the axis of said hub and that is tangent to the surface of the leading edge portion of an adjacent blade, other reactor blade elements formed integrally on said other hub extending in a generally radial direction and in spaced relative relationship about the axis of said hub, the surface of the leading edge of said other blade elements being displaced angularly from a reference plane containing said hub axis and a point on the surface of the trailing edge of an adjacent one of said other blade elements.

7. A hydrokinetic torque converter mechanism comprising a bladed impeller, a bladed turbine and a bladed reactor assembly situated in toroidal fluid flow relationship in a common torus circuit, a driving member connected to said impeller, a driven member connected to said turbine, said reactor assembly comprising two juxtaposed and abutting reactor parts each part comprising a hub, and overrunning brake means for anchoring said hub against rotation in one direction while accommodating free wheeling motion thereof in the opposite direction, one of said hubs having formed integrally therewith radially disposed reactor blades arranged in angularly spaced relationship about the axis of said hub, one blade being displaced angularly with respect to a reference plane that contains the axis of said hub and that is tangent to the surface of the leading edge portion of an adjacent blade, other reactor blade elements formed integrally on said other hub extending in a generally radial direction and in spaced relative relationship about the axis of said hub, the surface of the leading edge of said other blade elements being displaced angularly from a reference plane containing said hub axis and a point on the surface of the trailing edge of an adjacent one of said other blade elements, the trailing edge of said other blade elements and the leading edge of said first blade element being situated in registry whereby said first and said other blade elements define a substantially continuous flow directing blade assembly.

References Cited

UNITED STATES PATENTS

| 2,632,397 | 3/1953 | Jandasek | 60—54 XR |
| 2,755,628 | 7/1956 | Mamo | 60—54 |
| 3,192,862 | 7/1965 | Schrader | 60—54 XR |

EDGAR W. GEOGHEGAN, *Primary Examiner.*